United States Patent
Jur et al.

(10) Patent No.: US 6,998,550 B1
(45) Date of Patent: Feb. 14, 2006

(54) ROLLOUT INTERFACE LINKAGE FOR NETWORK PROTECTORS

(75) Inventors: Arthur James Jur, Greenwood, SC (US); Douglas Michael Brandt, Greenwood, SC (US); John Wesley Fail, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/947,837

(22) Filed: Sep. 23, 2004

(51) Int. Cl.
*H01H 9/00* (2006.01)
*H01H 9/22* (2006.01)

(52) U.S. Cl. .............................. 200/50.21; 200/50.24; 200/335; 335/132; 335/23

(58) Field of Classification Search ............ 200/50.21, 200/50.01, 50.1–50.3, 401; 335/23–25, 132
See application file for complete search history.

(56) References Cited

U.S. PATENT DOCUMENTS

| 5,721,406 A | * | 2/1998 | Book et al. .............. 200/50.24 |
| 6,031,192 A | * | 2/2000 | Liebetruth ............... 200/50.21 |
| 6,331,685 B1 | * | 12/2001 | Maldonado-Cortes ..... 200/17 R |
| 6,359,765 B1 | | 3/2002 | Bier |
| 6,472,620 B2 | * | 10/2002 | Rane et al. .............. 200/50.26 |
| 6,590,756 B2 | | 7/2003 | Meiners et al. |
| 6,597,266 B1 | * | 7/2003 | Rodriguez et al. .......... 335/132 |
| 6,642,463 B1 | * | 11/2003 | Turner ........................ 200/331 |
| 6,838,626 B2 | * | 1/2005 | Deylitz et al. ........... 200/50.21 |

* cited by examiner

*Primary Examiner*—Richard K. Lee
(74) *Attorney, Agent, or Firm*—Martin J. Moran

(57) ABSTRACT

An interface linkage assembly for a network protector is provided. The network protector includes a circuit breaker structured to move in and out of a housing assembly, and having a mechanical trip assembly and an electrical close assembly. The interface linkage includes a coupling device, a housing assembly portion and a rollout portion. The coupling device has a first component and a second component. The housing assembly portion is coupled to the coupling device first component. The rollout portion is coupled to the coupling device second component. The rollout portion is structured to be coupled to the mechanical trip assembly and the electrical close assembly, and further structured to move the mechanical trip assembly over a lesser arc and the electrical close assembly over a greater arc.

20 Claims, 5 Drawing Sheets

ROLLOUT INTERFACE LINKAGE FOR NETWORK PROTECTORS

BACKGROUND OF THE INVENTION

1. Field of the Invention

This invention relates to a network protector having a cable trip assembly and an electrical close assembly, more specifically, to a network protector which incorporates an interface linkage assembly structured to operate both the cable trip assembly and the electrical close assembly.

2. Background Information

Secondary power distribution networks consist of interlaced grids which are supplied by two or more sources of power so that the loss of a single source of power will not result in an interruption of service. Such networks provide the highest level of reliability possible with conventional power distribution and are normally used to supply high-density load areas such as a section of a city, a large building, or an industrial site. Between the power sources and the network is a transformer and a network protector. The network protector consists of a circuit breaker and a control relay. The circuit breaker includes at least one set of main contacts that move between an open position and a closed position. When the main contacts are closed, electricity may flow through the network protector. The control relay senses the transformer and network voltages and line currents and executes algorithms to initiate breaker tripping or closing action. Trip determination is based on detecting an overcurrent condition or reverse power flow, that is, power flow from the network to the energy source.

Network protectors are often found in dust-proof or moisture-proof housings, or vaults, which are disposed in subterranean passageways in large metropolitan areas. Given their urban, subterranean location, increasing the size of the vault to accommodate larger network protectors is costly and difficult. As such, it is more efficient to reduce the space occupied by certain network protector components so as to allow space for other newer/larger components. That is, by reducing the size of one component or sub-component, another component may be added or an existing component's size may be increased.

The network protector components, the circuit breaker and the relay, are located within a housing assembly within the vault. For safety, the circuit breaker should be tripped before the circuit breaker can be removed from the enclosure. To accomplish this, network protectors include a mechanical trip assembly which is structured to interact with the network protector trip bar. The trip bar is structured to move between a first position and a second position. In the first position, the trip bar prevents the main contacts of the network protector circuit breaker from moving into the closed position. Thus, when the trip bar is in the first position, the contacts are open. In the second position, the trip bar allows the main contacts to be moved into the closed position.

To safely remove, or install, the circuit breaker from the enclosure, the main contacts must be in the first, open position. To trip the circuit breaker, the trip bar must be moved into the first position. A typical mechanical trip assembly is structured to be actuated prior to opening the door to the enclosure. Accordingly, the mechanical trip included an external handle that may be actuated prior to opening the door to the housing assembly. Actuating the external operating handle moves the mechanical trip assembly, and therefore the trip bar, into the first position. Thus, before the housing assembly is opened, the circuit breaker was tripped. If required, however, it was possible to open the housing assembly with the trip bar in the second position, leaving the circuit breaker in the closed position. After maintenance and/or repairs are performed on the circuit breaker or the relay, and after the circuit breaker is installed in the vault, the mechanical trip assembly, and therefore the trip bar, are moved into the second position so that the main contacts could again be closed.

The mechanical trip assembly includes an external handle coupled to a shaft, a lever mounted on the shaft within the housing and a coupling device, such as a cable, extending between the lever and the trip bar. When the shaft is rotated, the lever moves causing the coupling device to act upon the trip bar. Typically, the shaft is structured to move through a lesser arc. That is, the shaft typically cannot move through a greater arc, e.g. greater than ninety degrees, as that amount of rotation may cause the coupling device to wrap around the shaft. The mechanical trip assembly and the circuit breaker are both mounted on a frame that is structured to move in and out of the enclosure. A spring biases the mechanical trip assembly to the first position in which the trip bar was moved into the trip bar first position which tripped the circuit breaker.

In operation, when the circuit breaker was in use and disposed within the enclosure, the lever was held so that the mechanical trip assembly was in a second position holding the trip bar in the second position. Prior to opening the door to the enclosure, a user actuated an external handle which was coupled to the lever, thereby moving the mechanical trip assembly into the first position which, in turn, moved the trip bar into the first position causing the circuit breaker to trip. At this point the circuit breaker could be safely removed from the enclosure. After the circuit breaker was returned to the housing assembly and the housing assembly closed, the procedure for closing the circuit breaker contacts included a step which returned the lever to its original position, i.e., the mechanical trip assembly and the trip bar were both moved into their respective second positions thereby allowing the contacts to be closed.

Newer network protector circuit breakers are further structured to close into electrical fault conditions. The closure of the circuit breaker contacts is accomplished by a closure device having a spring loaded mechanism. The closure device is actuated by an electrical close assembly. The electrical close assembly is, in turn, actuated by a shaft which the user rotates via an external handle. The typical electrical close assembly requires the actuating shaft to rotate through an extended arc.

Presently, newer network protectors with the electrical close assembly are being installed in enclosures structured to be used with older network protector circuit breakers, That is, the newer network protectors with the electrical close assembly are being installed in enclosures that are not adapted to interface with the electrical close assembly. Attempts have been made to adapt the enclosures to accommodate the electrical close assembly. These measures, however, require modification to the housing assembly which are expensive.

It is desirable to have the electrical close assembly actuated by the same external handle as the mechanical trip mechanism. One problem, however, with using a single handle and shaft to actuate both the mechanical trip mechanism and the electrical close assembly is that the mechanical trip mechanism can only move through a lesser arc whereas the electrical close assembly requires the shaft to move through a greater arc.

There is, therefore, a need for an interface linkage assembly structured to be coupled to a shaft on an external handle and to actuate an electrical close assembly and a mechanical trip mechanism.

There is a further need for such an interface linkage assembly to be incorporated into existing network protector and enclosures.

SUMMARY OF THE INVENTION

These needs, and others, are met by the present invention which provides an interface linkage assembly structured to be coupled to a housing assembly shaft extending into a network protector housing assembly. The interface linkage assembly includes a housing assembly portion and a rollout portion. The housing assembly portion includes one component of a shaft coupling device. The rollout portion includes a rollout shaft, another component of the shaft coupling device and a levered hub assembly.

The operating handle and operating handle shaft are coupled to the network protector housing assembly. The operating handle is disposed on the outer side of the housing assembly. The operating handle is coupled to the operating handle shaft which extends into the housing assembly. As described below, the operating handle is structured to move between an open position and a closed position, with a neutral position therebetween. On the interior end of the operating handle shaft is one component of a shaft coupling device, hereinafter, the housing side component. The shaft coupling device is described more fully below.

The rollout shaft is coupled directly to the electrical close assembly and is structured to be removed from the housing assembly with the circuit breaker when the circuit breaker is removed. The rollout shaft directly actuates the electrical close assembly as the rollout shaft rotates through a greater arc. The rollout shaft further includes a radial tooth adjacent to the electrical close assembly. The radial tooth engages the hub assembly to actuate the mechanical trip mechanism.

The rollout shaft is coupled to the housing assembly shaft by the coupling device. The coupling device includes the housing component and a rollout component. The rollout component is a keyed flange on the rollout shaft and the housing component is a captivator on the housing shaft. The captivator is, preferably, a U-shaped body structured to engage the keyed flange. When the keyed flange is engaged by the captivator, rotation of the handle and housing shaft is transmitted to the rollout shaft. The captivator, however, is structured to release the keyed flange when the circuit breaker is drawn out of the housing assembly and structured to engage the keyed flange when the circuit breaker is moved into the enclosure.

The hub assembly includes a collar, a hub arm and a hub arm spring. There is also a hub arm stop disposed adjacent to the hub arm and coupled to a rigid member. The hub arm stop is a protrusion that extends into the path of travel of the hub arm to prevent the hub arm from rotating. The collar has a ring-shaped body that has an inner diameter that is greater than the diameter of the rollout shaft. The collar is disposed about the rollout shaft and defines a gap between the rollout shaft and the ring-shaped body. A hub tooth extends from the ring-shaped body inwardly into the gap. A trip linkage, such as a cable, extends from the hub arm to the circuit breaker trip bar. The hub arm is structured to rotate between a first and a second position. As the hub arm is moved into the first position, the trip linkage moves the trip bar into the open position, thereby tripping the circuit breaker. As the hub arm is moved into the second position, the trip linkage moves the trip bar into the second position wherein the circuit break contacts may be closed. The spring is coupled to the housing and is structured to bias the hub arm against the hub arm stop. When the hub arm is against the stop, the hub assembly is in the second position.

In operation, where the circuit breaker contacts are closed and the circuit breaker is installed in a network protector housing assembly, a user may use the interface linkage assembly to trip and reset the circuit breaker as follows. Initially, the rollout shaft is in the neutral position and the hub arm is in the second position. In this configuration, the rollout shaft tooth is adjacent to the hub tooth. When a user moves the external handle to the open, or trip, position, the housing assembly shaft acts on the rollout shaft via the coupling device, thereby causing the rollout shaft to rotate. The rollout shaft tooth is moved into engagement with the hub tooth. When the rollout shaft tooth is moved into engagement with the hub tooth, rotation of the rollout shaft is transferred through the rollout shaft tooth to the hub tooth causing the hub assembly collar and hub arm to overcome the bias of the hub spring and move with the rollout shaft. Thus, the hub arm is rotated into the first position causing the mechanical trip assembly to move the trip bar to trip the circuit breaker. The rollout shaft is only required to move through a lesser arc to effect tripping of the circuit breaker.

When the user releases the external handle, the bias of the hub spring pulls the hub arm into contact with the hub arm stop. When moving in this direction, the hub tooth acts upon the rollout shaft tooth causing the rollout shaft to rotate. That is, the hub spring moves the hub arm back to the second position and the rollout shaft to the neutral position. Thus, the mechanical trip assembly will not prevent closure of the circuit breaker. Once the circuit breaker is tripped, the user may perform maintenance/repairs on the network protector and may remove the circuit breaker from the housing assembly. Once the maintenance/repairs operations are complete, or a new circuit breaker is ready to be installed, the user moves the circuit breaker into the housing where the circuit breaker may be closed.

To close the circuit breaker the user moves the external handle to a closed position. The closed position requires the housing shaft to rotate from the neutral position in a direction opposite the direction of the open position. Thus, the rollout shaft tooth is moved away from the hub tooth and does not act upon the hub tooth. Thus, the hub assembly collar and hub arm remain in the second position while the rollout shaft continues to rotate into the closed position. The rollout shaft is required to move through a greater arc to effect actuation of the electrical close assembly. Once the rollout shaft is rotated a sufficient amount, the electrical close assembly is actuated and the circuit breaker is closed. The user then returns the external handle to the neutral position.

Accordingly, the interface linkage assembly allows a single external handle to rotate the rollout shaft through a greater arc in order to effect actuation of an electrical close assembly while further allowing the hub assembly coupled to the mechanical trip assembly to travel through a lesser arc. Installation of the interface linkage assembly does not require any substantial modification of the network protector housing assembly.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
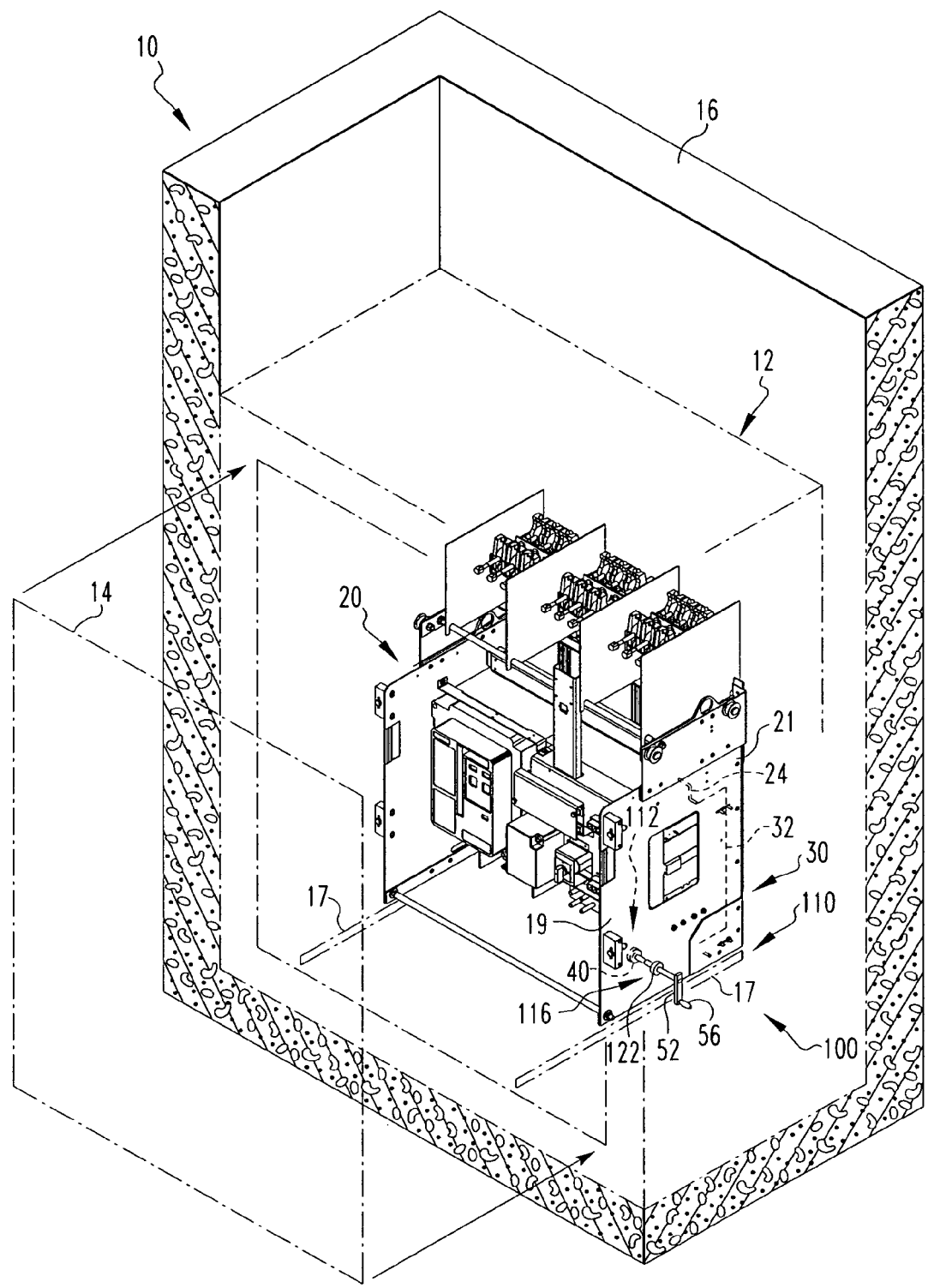
FIG. 1 is an isometric view of a network protector.

As shown in FIG. 1, a network protector 10 includes a housing assembly 12 which includes a movable door 14 that is attached to the housing assembly 12. The housing assembly 12 has an external operating handle assembly 50 (described below) which passes therethrough. The operating handle assembly 50, as will be described below, interacts with the trip bar 24 and may be actuated while the door 14 is closed. The housing assembly 12 is structured to be placed within a vault 16. The vault 16 is typically made of concrete or a similar material. The two primary network protector components, a circuit breaker 20 and a relay 22 are disposed within the housing assembly 12. The circuit breaker 20 is supported by a rollout carriage 19. The housing assembly 12 includes a set of rails 17 (shown schematically) upon which the rollout carriage 19 rests so that the circuit breaker 20 may be moved into and out of the housing assembly 12. The rollout carriage 19 includes at least one sidewall 21 disposed adjacent to the operating handle assembly 50, described below.

As is known in the art, the circuit breaker 20 includes at least one set of main contacts (not shown) that are structured to move between a first, open position and a second closed position. When the main contacts are in the second, closed position, electricity may flow through the circuit breaker 20. When the main contacts are in the first, open position, electricity cannot flow through the circuit breaker 20. The circuit breaker 20 also includes an operating mechanism (not shown) that is structured to move the main contacts between the first and second position. The operating mechanism includes a trip bar 24. The trip bar 24 is structured to move between a first position and a second position.

When the circuit breaker 20 is in use, both the main contacts and the trip bar 24 are in the second position. When the trip bar 24 moves from the second position to the first position, the operating mechanism will trip the circuit breaker 20. That is, the operating mechanism will cause the main contacts to move from the second position to the first position. So long as the trip bar 24 remains in the first position, the main contacts cannot be fixed in the second position. That is, so long as the trip bar 24 is in the first position, the circuit breaker 20 cannot be set in the closed position.

The network protector 10 further includes a mechanical trip assembly 30 and an electrical close assembly 40. The mechanical trip assembly 30 and the electrical close assembly 40 are, preferably, disposed on the rollout carriage 19 and move with the circuit breaker 20 in and out of the housing assembly 12. The mechanical trip assembly 30 includes a cable 32 that is coupled to the trip bar 24. The mechanical trip assembly cable 32 is structured to move the trip bar 24 between the first and second positions. Thus, the mechanical trip assembly 30 moves between a first position and a second position that corresponds to the trip bar 24 first and second positions. The electrical close assembly 40 is coupled to a closure device (not shown) that is structured to close the circuit breaker 20 as is known in the art. The mechanical trip assembly 30 is, preferably, actuated when an actuating device, preferably the hub arm 164 (described below), is rotated over an arc less than about 95 degrees, or "a lesser arc." The electrical close assembly 40 is, preferably, actuated when an actuating device, preferably the rollout shaft 140 (described below), is rotated over an arc greater than about 175 degrees, or "a greater arc."

The mechanical trip assembly 30 and the electrical close assembly 40 are actuated by an operating handle assembly 50 in conjunction with the interface linkage assembly 100 as described below. The operating handle assembly 50 includes an external operating handle 52 and a housing shaft 54. The operating handle 52 is disposed on the outer side of the housing assembly 12. The operating handle 52 is an elongated, rigid member that may include a generally perpendicular grip 56. The housing shaft 54 extends through a housing assembly opening 55 and is rotatably coupled to one wall on the housing assembly 12. The distal end 58 of the housing shaft 54 is disposed adjacent to the rollout carriage 19 when the rollout carriage 19 is disposed within the housing assembly 12.

Figure 2:
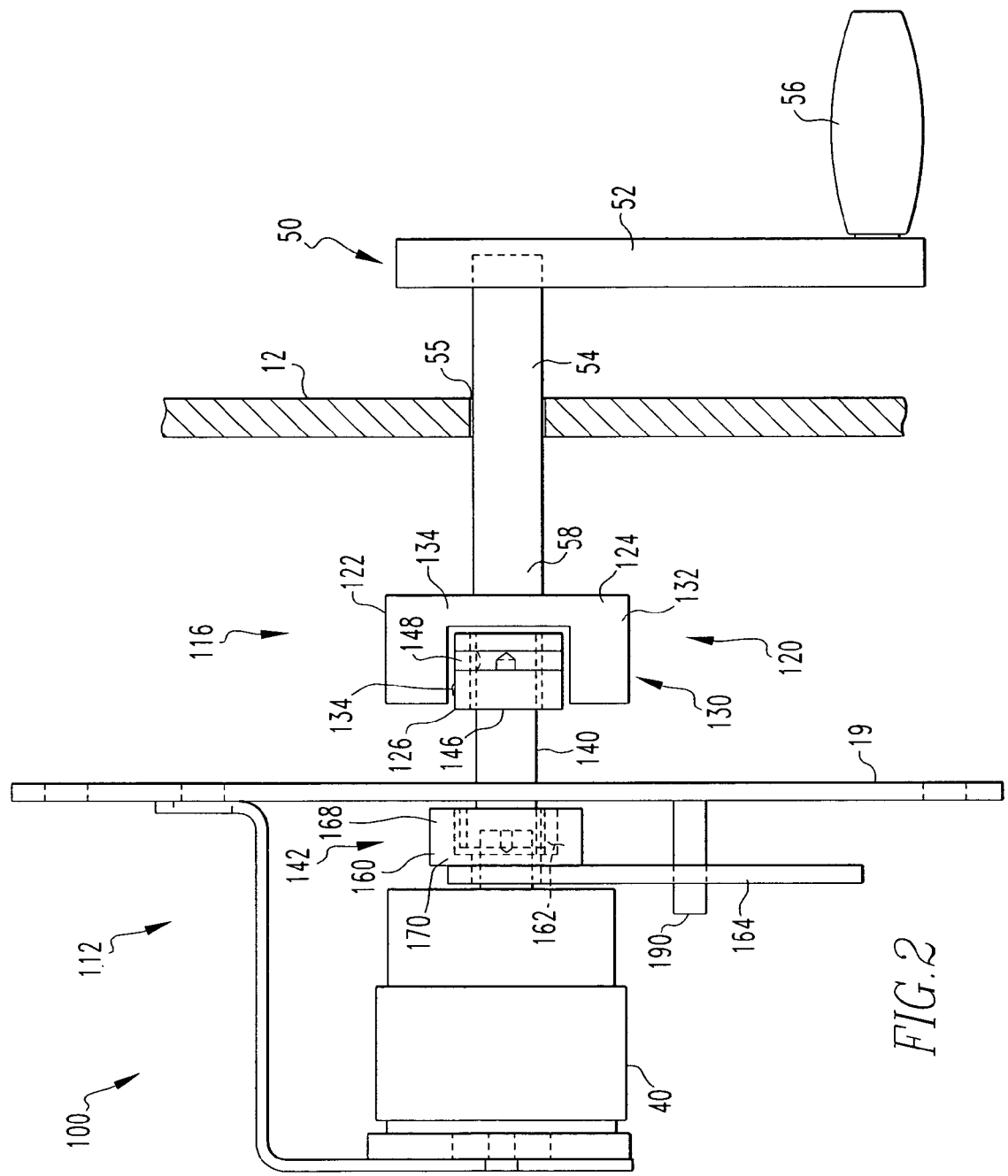
FIG. 2 is a side view of the interface linkage assembly.
Figure 3:
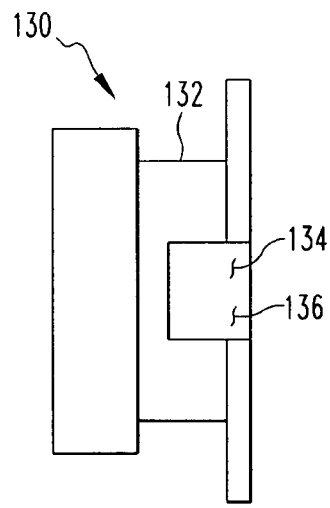
FIG. 3 is a side view of a captivator.
Figure 4:
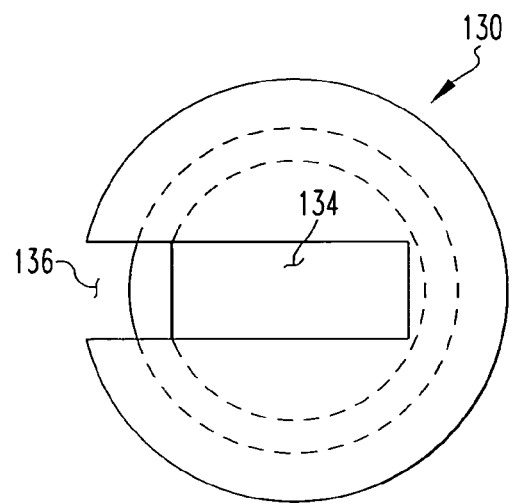
FIG. 4 is an end view of a captivator.

An interface linkage assembly 100 couples the operating handle assembly 50 to the mechanical trip assembly 30 and the electrical close assembly 40. As shown in FIG. 2, the linkage assembly 100 includes a housing assembly portion 110 and a rollout portion 112. The housing assembly portion 110 and the rollout portion 112 each include a component of a coupling device 120 structured to disengagably join the housing assembly portion 110 and the rollout portion 112. The housing assembly portion 110 includes a first component 124 of the coupling device 120. The coupling device first component 124 is, preferably, a captivator 130. As shown in FIGS. 3 and 4, the captivator 130 has a generally circular body 132 with a radial slot 134. The radial slot 134 includes a radial opening 136 at one side of the circular body 132. The circular body 132 is structured to be coupled to the housing shaft 54. The radial slot 134 is structured to engage the rollout shaft torpedo key end 147 (described below). The captivator 130 is disposed at the housing shaft distal end 58.

Figure 5:
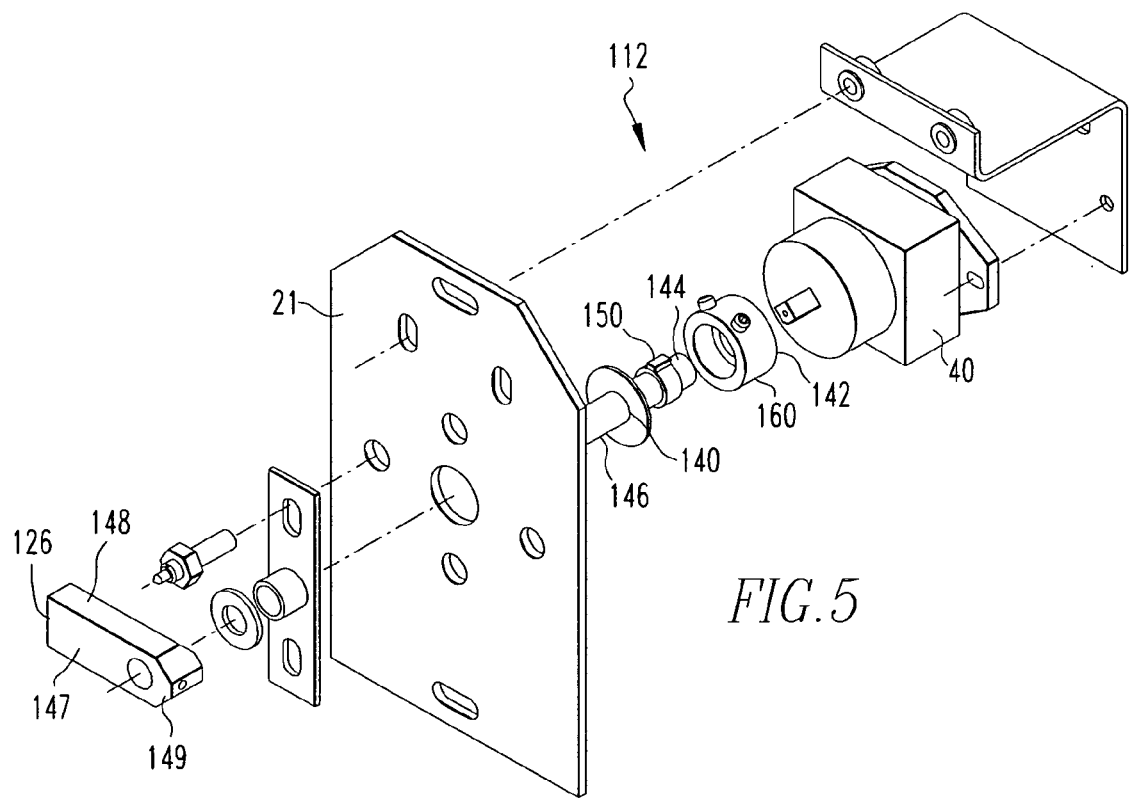
FIG. 5 is an exploded view of the rollout portion.

The interface linkage assembly rollout portion 112 is structured to be coupled to the mechanical trip assembly 30 and said electrical close assembly 40. The interface linkage assembly rollout portion 112 is structured to move the mechanical trip assembly 30 over a lesser arc and the electrical close assembly 40 over a greater arc as described below. The interface linkage assembly rollout portion 112 includes a rollout shaft 140 and a hub assembly 142. As shown in FIG. 5, the rollout shaft 140 has a first end 144 and a second end 146. The second end 146 includes the second component 126 of the coupling device 120. The coupling device second component 126 is, preferably, a torpedo key end 147. The torpedo key end 147 includes an elongated body 148 having at least one chamfered end 149. The torpedo key end 147 is structured to be coupled to the rollout shaft 140 adjacent to the chamfered end 149. The rollout shaft 140 extends through an opening 141 in the rollout carriage sidewall 21. The rollout shaft first end 144 is disposed on the inner side of the rollout carriage sidewall 21 and the keyed end 147 extending beyond the rollout carriage sidewall 21. The keyed end 147 is structured to engage the captivator 130 in fixed relation. That is, the keyed end 147 is structured to fit with the radial slot 134 so that rotation of the housing shaft 54 is directly translated to the rollout shaft 140.

The rollout shaft first end 144 is structured to operatively engage the electrical close assembly 40. That is, upon a sufficient rotation of the rollout shaft 140, the electrical close assembly 40 is actuated and the electrical close assembly 40 operates the closing device to close the circuit breaker 20. The rotation of the rollout shaft 140 required to actuate the electrical close assembly 40 is, preferably, rotation over an arc greater than 90 degrees.

The rollout shaft 140 further includes a tooth 150 disposed adjacent to the rollout shaft first end 144. The rollout shaft tooth 150 extends radially from the rollout shaft 140 and is structured to engage the hub tooth 176 (described below).

Figure 6:
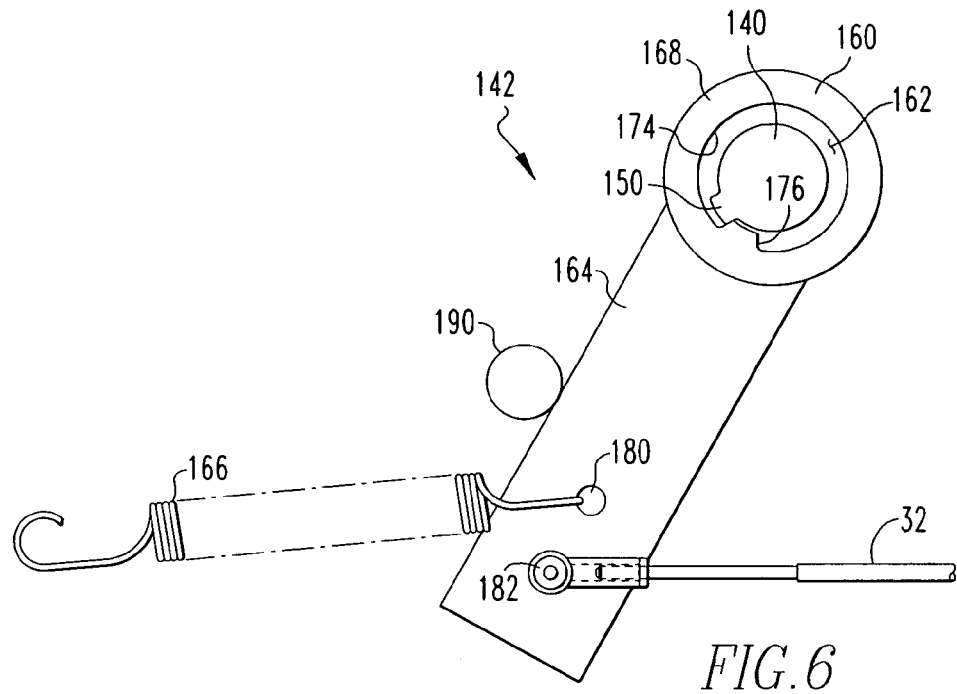
FIG. 6 is a partial end view of the interface linkage assembly in the neutral position.
Figure 7:
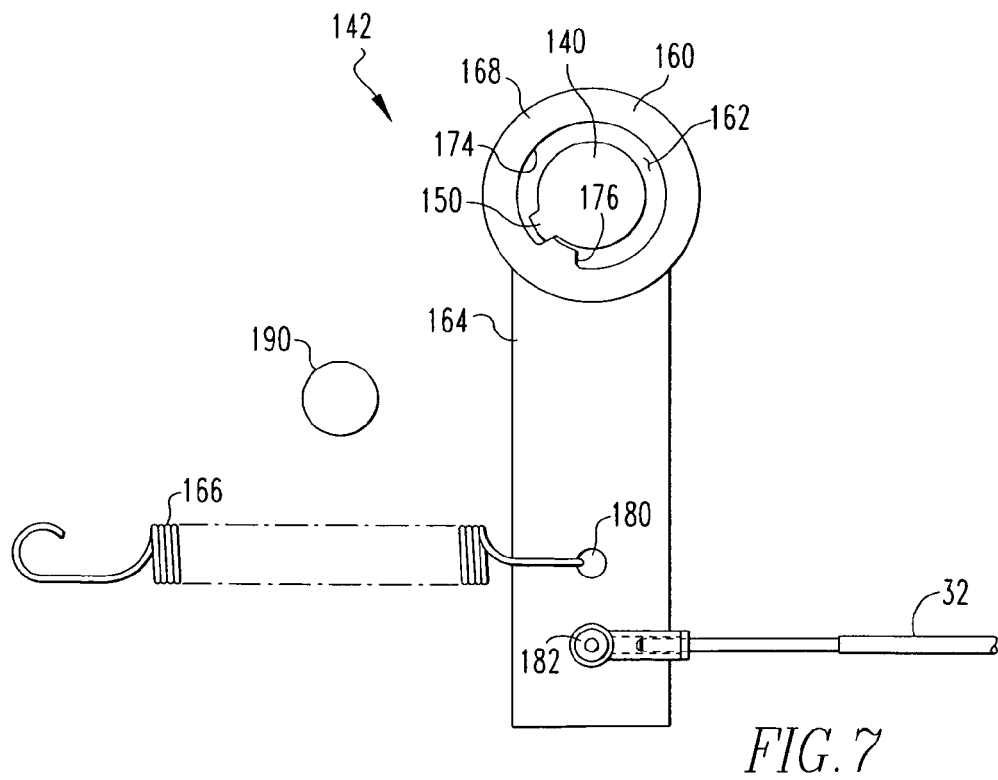
FIG. 7 is a partial end view of the interface linkage assembly in the open position.
Figure 8:
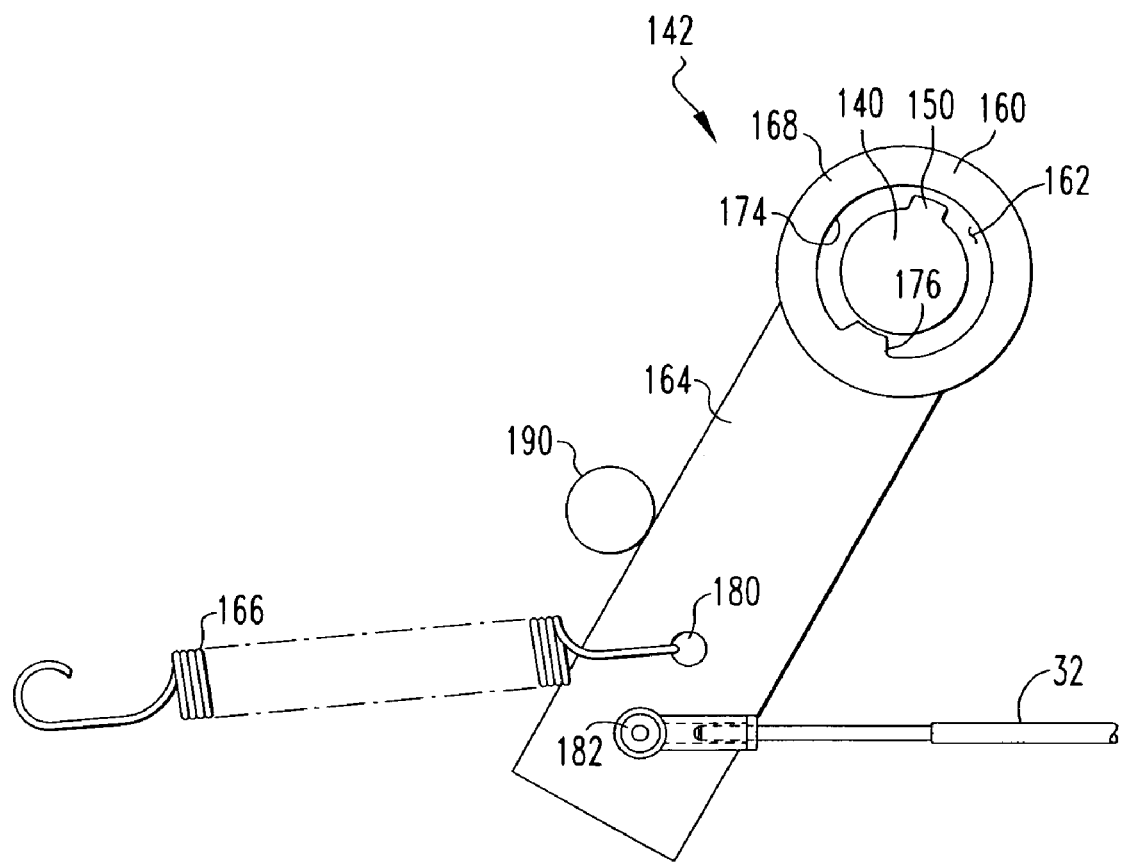
FIG. 8 is a partial end view of the interface linkage assembly in the closed position.

As shown in FIGS. 6–8, the hub assembly 142 includes a collar 160 defining a collar gap 162, a hub arm 164, and a hub arm spring 166. The collar 160 includes a ring-shaped body 168 coupled to an end plate 170 (FIG. 2). The end plate 170 includes an opening 172 (FIG. 2) sized to contact, without binding with, the rollout shaft 140. Thus, the collar 160 may rotate freely about the rollout shaft 140. The ring-shaped body 168 has an inner surface 174 having a diameter larger than both the rollout shaft 140 and the rollout shaft tooth 150. The ring-shaped body 168 and the end plate opening 172 have, generally, the same axis. Accordingly, the ring-shaped body inner surface 174 is spaced from the end plate opening 172. When the rollout shaft 140 is disposed within the end plate opening 172, the collar gap 162 is created. The ring-shaped body inner surface 174 further includes a hub tooth 176. The hub tooth 176 extends radially inwardly from the ring-shaped body inner surface 174. The hub tooth 176 is structured to engage the rollout shaft tooth 150.

The hub arm 164 is coupled, or integral, to the end plate 170. The hub arm 164 is an elongated member extending radially away from the collar 160. The hub arm 164 includes two openings, a spring opening 180 and a trip linkage opening 182, adjacent the distal end of the hub arm 164. The spring 166 is coupled to the spring opening 180. The mechanical trip assembly cable 32 is coupled to the trip linkage opening 182. Upon a sufficient rotation of the hub arm 164, the mechanical trip assembly 30 is actuated and the mechanical trip assembly 30 moves the trip bar 24 into the first position thereby tripping the circuit breaker 20. The rotation of the hub arm 164 required to actuate the mechanical trip assembly 30 is, preferably, rotation over an arc less than 95 degrees. Additionally, there is a hub arm stop 190 coupled to the rollout carriage sidewall 21. The hub arm stop 190 is a protrusion that extends into the path of travel of the hub arm 164 to prevent the hub arm 164 from rotating.

When assembled, the interface linkage assembly 100 is configured as follows. The housing shaft 54 is rotatably disposed in the housing assembly opening 55. The operating handle 52 is disposed outside the housing assembly 12 and may be actuated by a user when the housing assembly 12 is closed. The housing assembly portion 110 coupling device first component 124, that is, the captivator 130, is disposed within the housing assembly 12, but outside of the rollout carriage sidewall 21. The rollout portion 112 has the rollout shaft 140 disposed in the rollout opening with the coupling device second component 126, that is the keyed end 147, disposed outside the rollout carriage sidewall 21 and extending outwardly. Thus, when the circuit breaker 20 is in the housing assembly 12, the coupling device 120 first and second components 124, 126 are joined. That is, the keyed end 147 engages the captivator 130 in a fixed relation so that as the operating handle 52 is turned, the rollout shaft 140 is turned.

The rollout shaft first end 144 is coupled to the electrical close assembly 40. The hub assembly 142 is disposed on the rollout shaft 140 with the rollout shaft extending through the end plate opening 172. In this configuration, as shown in FIGS. 6–8, the ring-shaped body inner surface 174 is spaced from the rollout shaft 140 thereby creating the collar gap 162. The rollout shaft tooth 150 and the hub tooth 176 both extend into the collar gap 162 a sufficient length so that the two teeth 150, 176 will contact each other when rotated, as described below. The hub arm 164 is coupled to the spring 166 and the mechanical trip assembly cable 32 at the spring opening 180 and the trip linkage opening 182, respectively. This bias of the spring 166 draws the hub arm 164 into contact with the hub arm stop 190.

In operation, the operating handle assembly 50 and the interface linkage assembly 100 are structured to move between corresponding open positions, through neutral positions, and closed positions while the hub arm 164 moves between a first and a second position. The hub arm 164 first and second positions correspond to the trip bar 24 first and second positions as the hub arm 164 acts upon the trip bar 24 via the mechanical trip assembly cable 32. Thus, when the hub arm 164 is in the second position, the circuit breaker 20 may be closed, or be in the closed position, as described above. When the hub arm 164 is moved into the first position, the trip bar 24 is moved into the first position and the circuit breaker 20 is tripped as described above. As described below, the hub arm 164 first position corresponds to the operating handle assembly 50 and the interface linkage assembly 100 open positions and the hub arm 164 second position corresponds to the operating handle assembly 50 and the interface linkage assembly 100 neutral positions.

During normal operation of the network protector 10, the circuit breaker 20 is installed in the housing assembly 12, the contacts are closed, the mechanical trip assembly 30 is in the closed position and the interface linkage assembly 100 is in the neutral position. As shown in FIG. 3, the bias of the spring 166 draws the hub arm 164 into contact with the hub arm stop 190. The spring 166 also biases the hub tooth 176 against the rollout shaft tooth 150.

To trip the circuit breaker 20 manually in order to perform maintenance, repairs, or to replace the network protector 10, a user moves the operating handle assembly 50 into the open position. Rotation of the operating handle assembly 50 causes the linkage assembly 100 to move to the linkage assembly 100 open position and the hub arm 164 to move to the hub arm 164 first position. When the operating handle assembly 50 is moved into the open position, rotation of the housing shaft 54 is transferred through the coupling device 120 to the rollout shaft 140. Thus, the rollout shaft 140 is rotated counter-clockwise as shown in FIGS. 3 and 4. Rotation of the rollout shaft 140 causes the rollout shaft tooth 150 to move the hub tooth 176. As the hub tooth 176 rotates, the hub arm 164 is moved thereby moving the mechanical trip assembly cable 32. The mechanical trip assembly cable 32 acts upon the trip bar 24 moving the trip bar 24 into the first, open position thereby tripping the circuit breaker 20. As shown in FIGS. 7 and 8, the rotation of the hub arm 164 required to actuate the mechanical trip assembly 30 is, preferably, rotation over an arc less than 95 degrees.

When the user releases the operating handle assembly 50, the bias of the hub spring 166 again pulls the hub arm 164 into contact with the hub arm stop 190. Additionally, the hub arm 164 is moved to the hub arm 164 second position. That is, the hub spring 166 moves the hub arm 164 back into contact with the hub arm stop 190. When the hub arm 164 is moved to the hub arm 164 second position, the trip bar 24 is also moved into the second position. Thus, the mechanical trip assembly 30 will not prevent closure of the circuit breaker 20. Once the circuit breaker 20 is tripped, the user may perform maintenance/repairs on the network protector 10 or may remove the circuit breaker 20 from the housing assembly 12. During removal of the circuit breaker 20, the housing shaft 54 and the rollout shaft 140 are separated at the coupling device 120. That is, the coupling device second component 126, the keyed end 147, moves out of the coupling device first component 124, the captivator 130. Once the maintenance/repair operations are complete, or a new circuit breaker 20 is ready to be installed, the user moves the circuit breaker 20 into the housing where the circuit breaker 20 may be closed. During installation of the circuit breaker 20, the housing shaft 54 and the rollout shaft 140 are coupled at the coupling device 120. That is, the coupling device second component 126, the keyed end 147, moves into the coupling device first component 124, the captivator 130. When the keyed end 147 moves into the captivator 130, the captivator 130 engages the keyed end 147 so that rotation of the housing shaft 54 is transferred to the rollout shaft 140.

To close the circuit breaker 20 the user moves the external handle assembly 50 to the closed position. The closed position requires the housing shaft 54 to rotate from the neutral position in a direction opposite the direction of the open position. Thus, the rollout shaft tooth 150 is moved away from the hub tooth 176 and does not act upon the hub tooth 176. Thus, the hub assembly collar 160 and hub arm 164 remain in the second position while the rollout shaft 140 continues to rotate into the closed position. The rollout shaft 140 is required to move through a greater arc to effect actuation of the electrical close assembly 40. Once the rollout shaft 140 is rotated a sufficient amount, the electrical close assembly 40 is actuated and the circuit breaker 20 is closed. The user then returns the operating handle assembly 50 to the neutral position.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An interface linkage assembly for a network protector, said network protector having a housing assembly and a circuit breaker, said housing assembly having a rollout carriage structured to move in and out of said housing assembly, said housing assembly further having a sidewall with an opening and an operating handle with an operating handle shaft extending through said opening, said carriage having a sidewall with an opening, said circuit breaker coupled to said rollout carriage, said circuit breaker having a trip bar structured to trip said circuit breaker, an electrical close assembly and a mechanical trip assembly, said mechanical trip assembly coupled to said trip bar, said mechanical trip assembly structured to be actuated when an actuating device, is rotated over a lesser arc, said electrical close assembly structured to be actuated when an actuating device is rotated over a greater arc, said interface linkage assembly comprising:
   a coupling device having a first component and a second component;
   a housing assembly portion coupled to said coupling device first component;
   a rollout portion coupled to said coupling device second component; and
   said rollout portion structured to be coupled to said mechanical trip assembly and said electrical close assembly, and further structured to move said mechanical trip assembly over a lesser arc and said electrical close assembly over a greater arc.

2. The interface linkage assembly for a network protector of claim 1, wherein
   said rollout portion includes a rollout shaft and a hub assembly;
   said hub assembly is rotatably coupled to said rollout shaft and coupled to said mechanical trip assembly; and
   said rollout shaft is coupled to said electrical close assembly.

3. The interface linkage assembly for a network protector of claim 2, wherein
   said rollout shaft includes a tooth;
   said hub assembly includes an end plate, a collar, a hub tooth, and a hub arm;
   said end plate having an opening therethrough;
   said collar having an inner surface with a diameter greater than said rollout shaft; and
   wherein said hub assembly is coupled to said rollout shaft with said rollout shaft extending through said end plate opening with said collar disposed about said rollout shaft, thereby creating a gap, said rollout shaft tooth and said hub tooth extending into said gap and structured to engage each other.

4. The interface linkage assembly for a network protector of claim 3, wherein
   said hub assembly includes a hub arm stop coupled to said carriage and a spring structured to bias said hub arm against said hub arm stop; and
   wherein when said rollout shaft is rotated in a first direction, said rollout shaft tooth engages said hub tooth causing said hub assembly to rotate through the lesser arc, and, when said rollout shaft is rotated in the opposite direction, said rollout shaft tooth moves away from said hub tooth so that said spring biases said hub arm against said hub arm stop arresting rotation of said hub assembly while said rollout shaft moves through the greater arc.

5. The interface linkage assembly for a network protector of claim 1, wherein said first component and said second component are disengagably coupled to each other.

6. The interface linkage assembly for a network protector of claim 5, wherein
   said first component includes a captivator structured to be coupled to said operating handle shaft;
   said second component includes a key end coupled to said rollout shaft and structured to engage said captivator; and
   whereby the rotation of said operating handle causes said rollout shaft to rotate.

7. The interface linkage assembly for a network protector of claim 6, wherein
said captivator includes a radial slot having a radial opening;
said end includes an elongated body having a chamfered end;
said key end structured to fit within said slot; and
wherein said rollout portion may be disengaged from said housing assembly portion as said carriage is moved out of said housing assembly by said key end moving out of said radial slot and said rollout portion engages said housing assembly portion as said carriage moves into said housing assembly by said key end moving into said slot.

8. The interface linkage assembly for a network protector of claim 7, wherein
said rollout portion includes a rollout shaft and a hub assembly;
said hub assembly rotatably coupled to said rollout shaft and coupled to said mechanical trip assembly; and
said rollout shaft coupled to said electrical close assembly.

9. The interface linkage assembly for a network protector of claim 8, wherein
said rollout shaft includes a tooth;
said hub assembly includes an end plate, a collar, a hub tooth, and a hub arm;
said end plate having an opening therethrough;
said collar having an inner surface with a diameter greater than said rollout shaft; and
wherein said hub assembly is coupled to said rollout shaft with said rollout shaft extending through said end plate opening with said collar disposed about said rollout shaft, thereby creating a gap, said rollout shaft tooth and said hub tooth extending into said gap and structured to engage each other.

10. The interface linkage assembly for a network protector of claim 9, wherein
said hub assembly includes a hub arm stop coupled to said carriage and a spring structured to bias said hub arm against said hub arm stop;
wherein when said rollout shaft is rotated in a first direction, said rollout shaft tooth engages said hub tooth causing said hub assembly to rotate through a lesser arc, and, when said rollout shaft is rotated in the opposite direction, said rollout shaft tooth moves away from said hub tooth so that said spring biases said hub arm against said hub arm stop arresting rotation of said hub assembly while said rollout shaft moves through a greater arc.

11. A network protector comprising:
a housing assembly having a rollout carriage structured to move in and out of said housing assembly, said housing assembly further having a sidewall with an opening and an operating handle with a shaft extending through said opening;
said carriage having a sidewall with an opening;
a circuit breaker coupled to said rollout carriage, and having a trip bar structured to trip said circuit breaker;
an electrical close assembly coupled to, and structured to close, said circuit breaker, said electrical close assembly structured to be actuated when an actuating device is rotated over a greater arc;
a mechanical trip assembly, said mechanical trip assembly coupled to said trip bar, said mechanical trip assembly structured to be actuated when an actuating device, is rotated over a lesser arc; and
an interface linkage assembly comprising:
a coupling device having a first component and a second component;
a housing assembly portion coupled to said coupling device first component;
a rollout portion coupled to said coupling device second component; and
said rollout portion structured to be coupled to said mechanical trip assembly and said electrical close assembly, and further structured to move said mechanical trip assembly over a lesser arc and said electrical close assembly over a greater arc.

12. The network protector of claim 11, wherein
said rollout portion includes a rollout shaft and a hub assembly;
said hub assembly is rotatably coupled to said rollout shaft and coupled to said mechanical trip assembly; and
said rollout shaft is coupled to said electrical close assembly.

13. The network protector of claim 12, wherein
said rollout shaft includes a tooth;
said hub assembly includes an end plate, a collar, a hub tooth, and a hub arm;
said end plate having an opening therethrough;
said collar having an inner surface with a diameter greater than said rollout shaft; and
wherein said hub assembly is coupled to said rollout shaft with said rollout shaft extending through said end plate opening with said collar disposed about said rollout shaft, thereby creating a gap, said rollout shaft tooth and said hub tooth extending into said gap and structured to engage each other.

14. The network protector of claim 13, wherein
said hub assembly includes a hub arm stop coupled to said carriage and a spring structured to bias said hub arm against said hub arm stop; and
wherein when said rollout shaft is rotated in a first direction, said rollout shaft tooth engages said hub tooth causing said hub assembly to rotate through a lesser arc, and, when said rollout shaft is rotated in the opposite direction, said rollout shaft tooth moves away from said hub tooth so that said spring biases said hub arm against said hub arm stop arresting rotation of said hub assembly while said rollout shaft moves through a greater arc.

15. The network protector of claim 11, wherein said first component and said second component are disengagably coupled to each other.

16. The network protector of claim 15, wherein
said first component includes a captivator structured to be coupled to said operating handle shaft;
said second component includes a key end coupled to said rollout shaft and structured to engage said captivator; and
whereby the rotation of said operating handle causes said rollout shaft to rotate.

17. The network protector of claim 16, wherein
said captivator includes a radial slot having a radial opening;
said key end includes an elongated body having a chamfered end;
said key end structured to fit within said slot; and
whereby said rollout portion may be disengaged from said housing assembly portion as said carriage is moved out of said housing assembly by said key end moving out of said radial slot and said rollout portion engages said housing assembly portion as said carriage moves into said housing assembly by said key end moving into said slot.

18. The network protector of claim 17, wherein said rollout portion includes a rollout shaft and a hub assembly;

said hub assembly rotatably coupled to said rollout shaft and coupled to said mechanical trip assembly; and said rollout shaft coupled to said electrical close assembly.

19. The network protector of claim 18, wherein said rollout shaft includes a tooth;

said hub assembly includes an end plate, a collar, a hub tooth, and a hub arm;

said end plate having an opening therethrough;

said collar having an inner surface with a diameter greater than said rollout shaft; and wherein said hub assembly is coupled to said rollout shaft with said rollout shaft extending through said end plate opening with said collar disposed about said rollout shaft, thereby creating a gap, said rollout shaft tooth and said hub tooth extending into said gap and structured to engage each other.

20. The network protector of claim 19, wherein said hub assembly includes a hub arm stop coupled to said carriage and a spring structured to bias said hub arm against said hub arm stop;

wanted when said rollout shaft is rotated in a first direction, said rollout shaft tooth engages said hub tooth causing said hub assembly to rotate through a lesser arc, and, when rollout shaft is rotated in the opposite direction, said rollout shaft tooth moves away from said hub tooth so that said spring biases said hub arm against said hub arm stop arresting rotation of said hub assembly while said rollout shaft moves through a greater arc.

* * * * *